United States Patent Office 2,852,340
Patented Sept. 16, 1958

2,852,340

METHOD OF PRODUCING AMMONIUM NITRATE AND MAGNESIUM HYDROXIDE

Otto Kippe, Osnabruck, Germany, assignor of one-half to Paul O. Tobeler, doing business as Trans-Oceanic, Los Angeles, Calif.

No Drawing. Application August 9, 1954
Serial No. 448,777

1 Claim. (Cl. 23—103)

This invention has to do generally with the production of nitrogenous fertilizers, and relates particularly to improved methods for making such fertilizers with the simultaneous recovery of magnesium hydroxide, magnesium carbonate, or magnesium oxide (magnesia) through the treatment of crude dolomite with nitric acid and magnesium sulfate.

It is known in the art that a solution of crude dolomite dissolved in nitric acid may be reacted upon by burned dolomite to produce calcium nitrate and magnesia. This conversion is known to take place rapidly and rather completely in the presence of small amounts of ammonia or ammonium salts. Using this previously known method, it is necessary to burn half of the dolomite using considerable quantities of fuel and making the production of calcium nitrate and magnesia costly.

It has now been discovered in accordance with the present invention that nitrogenous fertilizers and magnesia may be produced economically without the necessity of burning the dolomite. This may be accomplished by treating a solution of crude dolomite dissolved in nitric acid with a concentrated solution of magnesium sulfate. Such treatment results in the formation of magnesium nitrate and calcium sulfate in accordance with the following equations:

(1) $CaCO_3 \cdot MgCO_3 + 4HNO_3 \rightarrow Ca(NO_3)_2 + Mg(NO_3)_2 + 2CO_2 + 2H_2O$ (2) $Ca(NO_3)_2 + Mg(NO_3)_2 + MgSO_4 \rightarrow 2Mg(NO_3)_2 + CaSO_4$

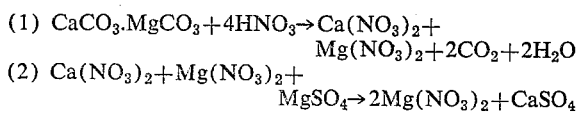

As magnesium sulfate in the form of Kiesarite ($MgSO_4 \cdot H_2O$) or Epsom salts is readily obtainable in nature or as low-cost by-product material from chemical plants, this salt has direct and practicable utility for use in the present process. After separation of the calcium sulfate, the remaining solution of magnesium nitrate is treated with ammonia or alkaline or alkaline forming compound of the group consisting of ammonia gas, the hydroxides and carbonates of ammonia, and the alkali metal hydroxides and carbonates to produce a separable nitrate and a calcinable magnesium compound of the class consisting of magnesium hydroxide and magnesium carbonate. Typically the magnesium nitrate may be treated with ammonia or an alkaline solution of sodium carbonate or ammonium carbonate. When using ammonium carbonate, the latter may be obtained by combining the ammonia with carbonic acid generated when the crude dolomite is dissolved in nitric acid in accordance with Equation 1. The magnesium will be precipitated out in the form of magnesium hydroxide or basic magnesium carbonate, and the remaining solution will consist of ammonium or alkali metal nitrate. By this process 85% to nearly 100% of the magnesium may be precipitated. This is surprising since it is known that in the case of magnesium chloride only 50%, and in the case of magnesium sulfate only 60%, of the magnesium is precipitated out with the application of double equivalent quantities of ammonia.

After the separation of the magnesium hydroxide or magnesium carbonate, the ammonia or alkali nitrates solution is evaporated and processed into fertilizers. The calcium sulfate which results from the introduction of the magnesium sulfate in the second step of the process, and which compares favorably with the natural gypsum, may be transformed into calcium carbonate and ammonium sulfate upon treatment with ammonia and carbonic acid according to the following equation:

(3) $CaSO_4 + 2NH_3 + CO_2 = CaCO_3 + (NH_4)_2SO_4$

The carbonic acid generated when the crude dolomite is dissolved in nitric acid may be used in the above phase of the process.

The calcium carbonate may serve further in being combined with the ammonium nitrate obtained from the treatment of the magnesium nitrate solution with ammonia, for the production of calcium ammonium nitrate (kalkammonsaltpeter), while the ammonium sulfate in conjunction with ammonium nitrate, yields ammonium sulfate nitrate (ammonsulfate saltpeter).

The present method, therefore, makes it possible to obtain, in a simple and economical manner, from dolomite, nitric acid, magnesium sulfate, ammonia and other alkaline solutions, the following: magnesium hydroxide, magnesium carbonate, magnesia, calcium ammonium nitrate (kalkammonsaltpeter), ammonium sulfate nitrate (ammonsulfate saltpeter), and other alkali nitrates.

*Example I*

To 3 liters nitric acid (1.23 sp. gr.) add gradually 1.1 kg. of crude dolomite having a content of 20% MgO and 31.5% of CaO, and, after the completion of the carbonic acid generation, remove the insoluble residue from the solution through filtering or settling processes. The remaining solution is then treated with a concentrated solution of 1.5 kg. magnesium sulfate ($MgSO_4 \cdot 7H_2O$) in 1.5 liters of water and agitated until all of the calcium nitrate is precipitated as calcium sulfate which, after being filtered from the solution, is treated with ammonia and carbonic acid, producing calcium carbonate and ammonium sulfate. The carbonic acid may be obtained when dissolving the crude dolomite in nitric acid.

Into the filtrate, which consists of a solution of magnesium nitrate, is introduced 800 gr. ammonia gas, which precipitates the magnesium as magnesium hydroxide in a form easily separated with a suction filter. This, when washed, dried, and calcined, yields 350 gr. magnesia (=87.5%).

The ammonium alkali filtrates solution may be neutralized with nitric acid or nitrous oxide gas. It may then be processed with the calcium carbonate obtained previously, to produce calcium ammonium nitrate. It may also be processed with the ammonium sulfate obtained when treating the calcium sulfate with ammonia and carbonic acid. This produces ammonium sulfate nitrate.

*Example II*

Replacing the 800 gr. ammonia gas used in Example 1 to precipitate the magnesium with 1 kg. sodium carbonate, an easily filterable basic magnesium carbonate is precipitated, which, when washed, dried and calcined, also yields 350 gr. magnesia.

The filtrate yields 1.7 kg. sodium nitrate which may be treated with potassium chloride before evaporating, in which case a corresponding quantity of potassium nitrate will be produced.

I claim:

The method of producing ammonium nitrate and magnesium hydroxide from crude dolomite, that includes dissolving crude dolomite in nitric acid to form calcium nitrate and magnesium nitrate in solution, reacting a concentrated aqueous solution of magnesium sulfate with said resulting nitrates in solution to precipitate substantially all of the calcium content thereof as calcium sulfate and to form a concentrated magnesium nitrate solution, separating substantially all of the calcium sulfate precipitate from the concentrated magnesium nitrate solution, and reacting said concentrated magnesium nitrate solution containing substantially all of the magnesium content of said starting dolomite and magnesium sulfate with sufficient ammonia to precipitate over 95% of the magnesium content of said solution as calcinable magnesium hydroxide and to produce separable ammonium nitrate.

References Cited in the file of this patent

UNITED STATES PATENTS

| | | |
|---|---|---|
| 1,986,509 | MacIntire | Jan. 1, 1935 |
| 2,058,141 | Dougherty | Oct. 20, 1936 |
| 2,079,324 | Krauch et al. | May 4, 1937 |
| 2,130,240 | Kippe | Sept. 13, 1938 |
| 2,258,709 | MacIntire | Oct. 14, 1941 |
| 2,288,610 | Dean | July 7, 1942 |
| 2,354,584 | Elkington et al. | July 25, 1944 |